Nov. 17, 1959 P. ROSENBERG 2,913,278
VEHICLE SEAT SAFETY BRACE
Filed April 21, 1958 2 Sheets-Sheet 2
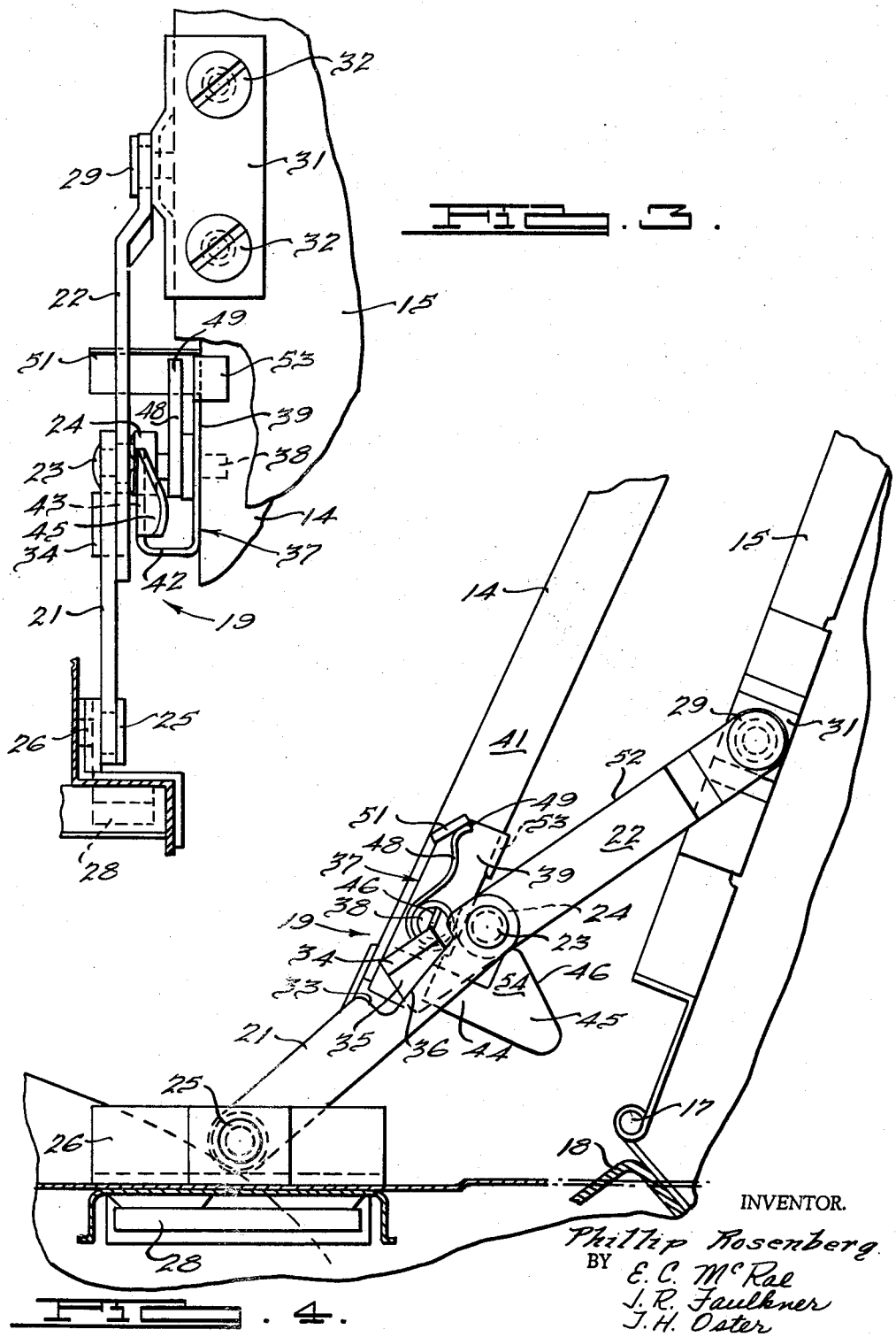
INVENTOR.
Phillip Rosenberg
BY E.C. McRae
J.R. Faulkner
J.H. Oster
ATTORNEYS.

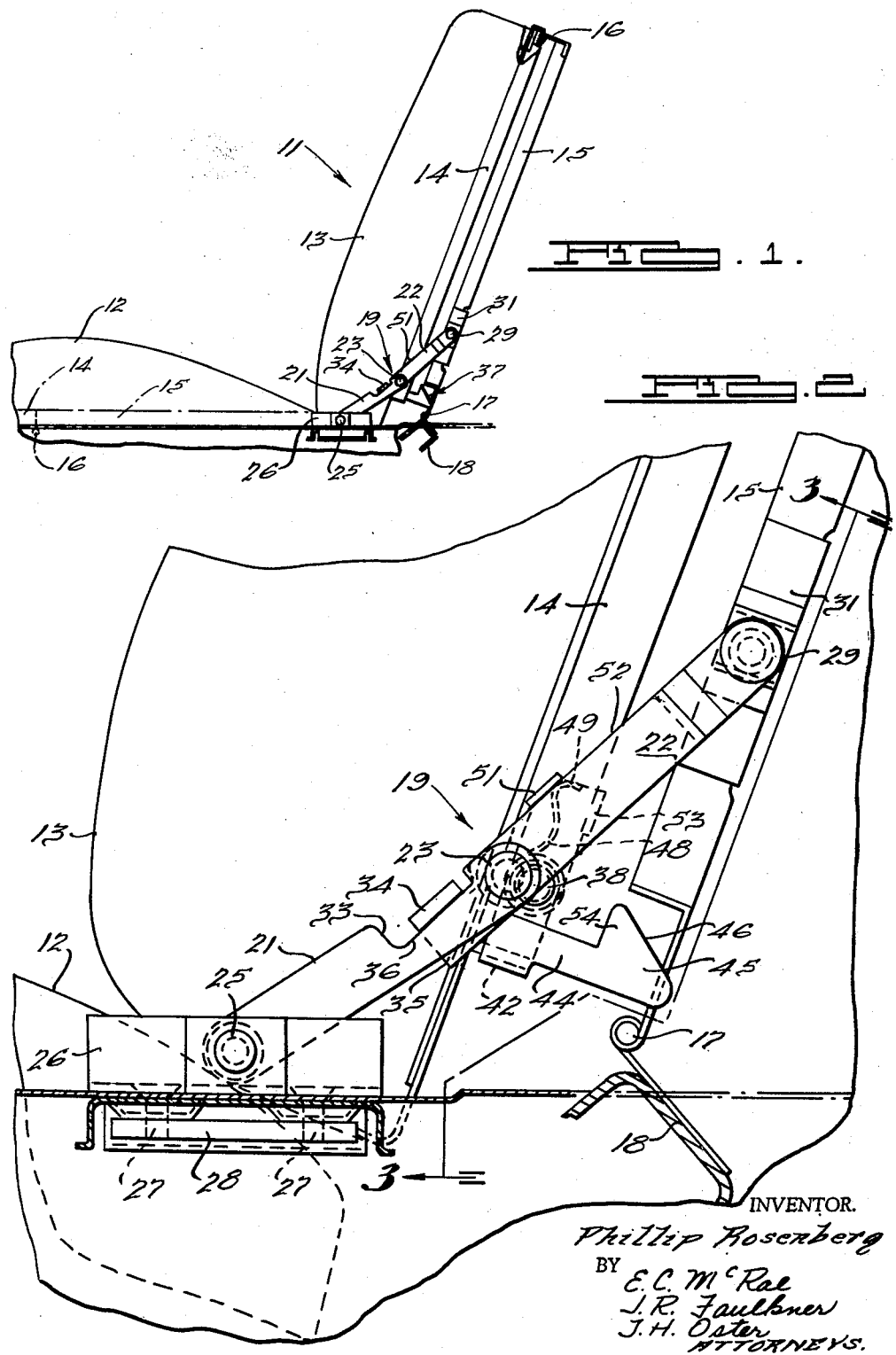

United States Patent Office 2,913,278
Patented Nov. 17, 1959

2,913,278

VEHICLE SEAT SAFETY BRACE

Phillip Rosenberg, Oak Park, Mich., assignor to Ford Motor Company, Dearborn, Mich., a corporation of Delaware Application April 21, 1958, Serial No. 729,619

5 Claims. (Cl. 296—66)

This invention relates to a safety brace for a foldable vehicle seat.

A current and increasingly popular style of motor vehicle is the so-called station wagon. One model is provided with a utility or third seat which may be removed for storage, if desired. The back cushion for this third seat is adapted to be supported, when installed in the vehicle body, on a raised part of the floor board. The floor board part involved comprises a sectional member adapted to be foldably raised to a substantially upright position when called upon to function as a seat back. The floor board seat back panel comprises two sections hinged together at their adjacent edges. One of the sections is also hinged at an opposite edge to the adjacent edge of a floor recess adapted to receive the panel sections when flattened out to function as a part of the floor board. In raising the panel into seat back position, its one section must be swung upwardly about the floor hinge axis while its other section, in effect, is simultaneously swung downwardly about the axis of the hinge connecting it to the first mentioned section. The two panel sections are thus placed in back to back relationship ready to receive the seat back cushion.

One disadvantage of the foregoing structure is the tendency of the folded panels and the seat back cushion supported thereon to swing forwardly whenever the vehicle is brought to an abrupt stop. It is an object of the present invention to provide a brace structure effective to prevent forward motion of the seat under abrupt stop conditions but which in no way hinders the normal restoration of the floor panel to a flat position in the plane of the floor. It is a further object to provide a seat brace which requires no conscious effort on the part of the person raising or lowering the seat back panel sections to operatively engage or disengage the brace structure.

The third seat brace embodying the present invention comprises a pair of pivotally connected toggle links. The free end of one of the links is pivotally connected to the floor and the free end of the other link is pivotally connected to one of the sections of the sectional floor board panel. In the substantially upright position of the panel, the links are extended but lie at a predetermined angle beyond a dead center position with respect to each other. The links are provided with coacting portions effective to prevent overtravel beyond the predetermined angular position. The dead center locking action is adapted to be broken by catch means carried by the other floor board section, the catch means being effective upon normal unfolding movement of the catch means carrying panel to swing said links through the dead center position thereby permitting both sections to be unfolded.

Other objects and advantages of the invention will be made more apparent as this description proceeds, particularly when considered in connection with the accompanying drawings, wherein:

Fig. 1 is a fragmentary side elevation of the third seat in erected position;

Fig. 2 is an enlarged view of the lower right corner of Fig. 1 illustrating the brace structure for maintaining the seat structure upright;

Fig. 3 is an end view taken substantially along the line 3—3 of Fig. 2 looking in the direction of the arrows;

Fig. 4 is a view in part similar to Fig. 2 illustrating the brace structure in an intermediate position.

Referring now to the drawings, Fig. 1 illustrates the general construction and arrangement of the utility or third seat, generally designated 11, of a station wagon. The third seat comprises a removable seat cushion 12 and a removable back cushion 13. It is the latter cushion or, more particularly, the support therefor with which the present invention is most directly concerned. The back cushion 13 is adapted to be removably suspended on what is normally a part of the vehicle floor board. This floor board part comprises two sections 14 and 15 which are hinged to each other at 16, the hinge being at the upper edges of the panel sections as viewed in Fig. 1. The panel section 15 is also hinged by a suitable hinge or hinges 17 to a hinge bracket 18 in the vehicle body floor. As shown in dot and dash outline in Fig. 1, the panel sections are adapted to be flat, the seat and back cushions first having been removed from the vehicle for storage. In raising the floor board sections to provide a support for the back cushion 13, the movement is such, with reference to Fig. 1, that the floor board section 15 is swung in a clockwise direction about the axis of the hinge 17. The floor board section 14 is carried bodily rearwardly with the floor board section 15 while being swung in a counterclockwise direction about the axis of the hinge 16. After the floor board sections have been raised to their Fig. 1 position, the back cushion 13 is hung on the front face of the floor board section 14 in any convenient manner.

A simple strap or a simple link structure would suffice to maintain the floor board sections and back cushion in a substantially upright position against the weight of the cushion and floor board sections. However, should the vehicle be subjected to a sudden stopping action, the inertia forces acting on the seat back and floor board sections would be such that the whole unit would be thrown forward. Accordingly, the present invention provides a toggle link brace device, generally designated 19, effective to prevent such forward movement of the seat. Although only one brace device 19 is visible in the drawings, it will be understood that two such devices may be employed, one for each side of the seat structure. The devices will be symmetrical and, accordingly, the description of the one will fully apply to the other.

The toggle link brace device 19 comprises a pair of toggle links 21 and 22 pivotally connected by a suitable pivot stud 23 having an enlarged head portion 24 (see Fig. 3), for a reason to become apparent. The lower end of the toggle link 21 is pivotally secured by rivet 25 to a bracket 26 held by screws 27 to a vehicle frame member 28. The upper end of the link 22 is secured by a rivet 29 to a bracket 31 secured to the floor board section 15 by suitable bolts or screws 32 (see Fig. 3).

The link 21 is provided near its upper end with a notch 33 extending inwardly from the upper edge thereof. The notch 33 is adapted to receive a lug 34 turned at right angles to the plane of the link 22 and paralleling the longitudinal axis of the latter. The lug 34 is on an end portion 35 of the link 22. The end portion 35 extends beyond the pivotal connection of the link 22 and link 23 so as to underlie a substantial portion of the latter link. The base 36 of the notch 33 is angularly inclined relative to the longitudinal axis of the link 21, the angle of inclination being such that it is parallel to the lug 34 in the position of the links 21 and 22 shown in Fig. 2.

The links 21 and 22 when in the Fig. 2 position are slightly angularly inclined with respect to each other. In effect, when so positioned they are beyond the dead-center position and are held in this over dead-center position by the lug 34. In the event sudden stoppage of the vehicle should create inertia forces tending to swing the seat back cushion and floor board seat back sections forward, the links 21 and 22 will act as a unitary strut bracing the seat assembly against such forward movement.

Provision is made ensuring that the links 21 and 22 are positioned beyond the dead-center position when the floor board sections are raised to provide the seat back and that the links are automatically forced through the dead-center position when it is desired to restore the floor board sections to a floor level position. The toggle link device 19 incorporates a catch device 37 pivotally mounted on a rivet 38 on the floor board section 14 near the free end thereof. The catch device 37, although of intricate shape, is adapted to be stamped of a single piece of metal. It comprises a substantially rectangular plate portion 39 which lies flat against the end face 41 of the floor board section 14, being swingably secured thereto by the rivet 38. At its lower end, as viewed in Fig. 3, the main portion 39 is provided with a flange 42 terminating in an upwardly extending leg portion 43. Projecting from the leg portion is a fingerlike portion 44 having a hook-like end section 45 provided with a lead chamfer 46.

The rivet 38 securing the catch device 37 to the side face 41 of the floor board section 14 is provided with a kerf 47 adapted to receive the inner end of a small spiral spring 48, the free end 49 of the spring abutting an elongated lug 51. The plane of the lug 51 is such that the lug will lie flat against the side face 52 of the link 22 in its Fig. 2 or seat bracing position.

The upper end of the catch device plate portion 39 is provided with a second lug 53 extended in a direction opposite to the lug 51. The lug 53 engages the rear face of the floor board section 14 at the edge thereof and acts as a stop preventing counterclockwise swinging movement of the catch device 19.

The functions of the various elements of the brace structure 19 may be made readily apparent by following the movement of the floor board sections from a position in the plane of the vehicle floor to a seat back supporting position and back to a floor plane position. When the floor board sections are flattened out, as shown in dot and dash outline in Fig. 1, the links 21 and 22 lie in folded parallel relationship alongside of the floor board section 15. The connection 23 between the links 21 and 22 lies, as viewed in Fig. 1, to the left or forwardly of the pivot connection 25, but in the same horizontal plane.

The floor board sections may be raised by grasping a suitably placed hand grip (not shown) located near the hinge axis 16. The floor board section 15 would be raised or swung upwardly clockwise about the hinge axis 17 causing the floor board panel 14 to be swung downwardly in a counterclockwise direction relative to the hinge axis 16. The links 21 and 22 would meanwhile be unfolding with the link 22 pulling the link 21 upwardly in a clockwise direction about the latter's pivot axis 25. In a conventional toggle link structure the links 21 and 22 would assume a straight line position preventing further movement of the panel 15 and would have to be manually shoved beyond a dead center position to lock the panel 15 in an upright position.

In the operation of the toggle link construction and arrangement embodying the present invention, the catch device 19 automatically functions to place the toggle links in an over-center position. As the floor board section 14 swings downwardly, the lead chamfer 46 on the end section 45 of the catch 37 abuts the enlarged head portion 24 of the link pivot stud 23. The spring 48 yieldingly permits the end section 45 to pass under the stud head 24. The lug 51 of the catch 37 engages the side face 52 of the link 22 urging it and the pivotally interconnected link 21 toward the over-center position. The final over-center position is reached or determined upon engagement of the lug 34 carried by link 22 with the edge 36 of the notch 33 in the link 21. The engagement of the lug 51 with the side face 52 of the link 22 maintains sufficient pressure on the latter causing it and its companion link 21 to be held in the over-center position.

As will be noted with reference to Fig. 2, in operative position of the brace the hook portion 54 of the catch 37 is in alignment with the enlarged head portion 24 of the link pivotal connection 23. To restore the floor board sections to the plane of the vehicle floor, it is only necessary that the floor board section 14 be grasped at the lower free edge and pulled away from the hinge axis 17. The hook portion 54 of the latch end section 45 will then catch on the enlarged head 24 of the link pivotal connection 23 causing the pivotal connection to be pulled through the dead-center position of the links. With the links "broken" or moved beyond dead-center position, the unfolding of the panels may progress unimpeded. As the floor board sections move downwardly relative to the vehicle body floor, a point will be reached at which the hook portion 54 of the catch end 45 will pass freely beneath the pivot stud head 24.

It will be understood that the invention is not to be limited to the exact construction shown and described, but that various changes and modifications may be made without departing from the spirit and scope of the invention, as defined in the appended claims.

What is claimed is:

1. In a vehicle body having a foldable floor panel hinged at one of its ends to the vehicle body floor and adapted to be raised into a folded and substantially upright position to form a seat back, a brace structure to prevent forward swinging movement of said panel from said upright position in the event of a sudden vehicle stop, said brace structure comprising a pair of toggle links pivotally connected to each other, the free end of one of said links being pivotally connected to said floor and the free end of the other link being pivotally connected to a first section of said foldable panel, said links in the upright position of said panel being extended but lying at a predetermined angle beyond a dead center position with respect to each other, coacting means on said links effective to maintain the same in said angular relationship, and means carried by a second section of said panel effective to swing said links through said dead center position upon movement of said second section toward unfolded position thereby to permit normal unfolding of said panel.

2. In a vehicle body having a foldable panel comprising a front and rear section hinged to each other, said rear section being also hinged to the vehicle body floor, said foldable panel being adapted to be raised into a folded and substantially upright position to form a seat back with the front section thereof in back to back relation to said rear section and suspended from the hinge connection therebetween, a brace structure to prevent forward swinging movement of said folded panel about the floor hinge axis in the event of a sudden vehicle stop, said brace structure comprising a pair of toggle links pivotally connected to each other, the free end of one of said links being pivotally connected to said floor for swinging movement about an axis spaced from said floor hinge axis and the free end of the other link being pivotally connected to said rear section, said links in the seat back forming position of said panel being extended but lying at a predetermined angle beyond a dead center position with respect to each other, coacting means on said links effective to maintain the same in said angular relationship, and means carried by the forward section of said panel to swing said links through said dead center position upon movement of said forward section toward unfolded position thereby to permit normal unfolding of said panel.

3. In a vehicle body having a foldable floor panel hinged at one of its ends to the vehicle body floor and adapted to be raised into a folded and substantially upright position to form a seat back, a brace structure to prevent forward swinging movement of said panel from said upright position in the event of a sudden vehicle stop, said brace structure comprising a pair of toggle links pivotally connected to each other, the free end of one of said links being pivotally connected to said floor forwardly of the floor panel folded position and the free end of the other link being pivotally connected to one section of said foldable panel, said links in the upright position of said panel being extended but lying at a predetermined angle beyond a dead center position with respect to each other, coacting means on said links effective to maintain the same in said angular relationship, and means carried by another section of said panel to swing said links through said dead center position upon movement of said last mentioned section toward unfolded position thereby to permit normal unfolding of said panel, said last mentioned means comprising a catch element pivotally mounted on said last mentioned section and operatively engageable with said links only in normal unfolding direction of movement.

4. In a vehicle body having a foldable panel comprising a front and rear section hinged to each other, said rear section being also hinged to the vehicle body floor, said foldable panel being adapted to be raised into a folded and substantially upright position to form a seat back with the front section thereof in back to back relation to said rear section and suspended from the hinge connection therebetween, a brace structure to prevent forward swinging movement of said folded panel about the floor hinge axis in the event of a sudden vehicle stop, said brace structure comprising a pair of toggle links pivotally connected to each other, the free end of one of said links being connected to said floor away from the floor hinge axis and the free end of the other link being pivotally connected to said rear section, said links in the seat back forming position of said panel being extended but lying at a predetermined angle beyond a dead center position with respect to each other, coacting means on said links effective to maintain the same in said angular relationship, and means carried by the forward section of said panel to swing said links through said dead center position upon movement of said forward section toward unfolded position thereby to permit normal unfolding of said panel, said last mentioned means comprising a catch element pivotally mounted on said forward section and operatively engageable with said links only in normal unfolding direction of movement.

5. In a vehicle body having a foldable panel comprising a front and rear section hinged to each other, said rear section being also hinged to the vehicle body floor, said foldable panel being adapted to be raised into a folded and substantially upright position to form a seat back with the front section thereof in back to back relation with said rear section and suspended from the hinge connection therebetween, a brace structure to prevent forward swinging movement of said folded panel about the floor hinge axis in the event of a sudden vehicle stop, said brace structure comprising a pair of toggle links pivotally connected to each other, the free end of one of said links being connected to said floor forwardly of the floor hinge axis and the free end of the other link being pivotally connected to said rear section, said links in the seat back forming position of said panel being extended but lying at a predetermined angle beyond a dead center position with respect to each other, coacting means on said links effective to maintain the same in said angular relationship, and means carried by the forward section of said panel to swing said links through said dead center position upon movement of said forward section toward unfolded position thereby to permit normal unfolding of said panel, said last mentioned means comprising a catch element pivotally mounted on said forward section, said catch element being in alignment with a shoulder portion of the means pivotally connecting said links, and spring means effective to permit said catch element to bypass said shoulder portion in panel folding direction of movement.

References Cited in the file of this patent

UNITED STATES PATENTS 1,587,006   Ledwinka _____ June 1, 1926

FOREIGN PATENTS 106,977   Australia _____ Mar. 30, 1939
471,000   Great Britain _____ Aug. 26, 1937